Patented June 30, 1942

2,288,326

UNITED STATES PATENT OFFICE 2,288,326

INTERNAL COMBUSTION ENGINE

Harry Ralph Ricardo, London, England

Application May 21, 1940, Serial No. 336,450
In Great Britain June 1, 1939

20 Claims. (Cl. 123—65)

This invention relates to the control of internal combustion engines operating on the two-stroke cycle and with compression ignition and has for its object to provide a method and means for effecting such control when an engine is running under "idling" conditions. The expression "idling" is here used as designating the condition when the engine is running under no load and the fuel charge is reduced below that for normal running under load, as for instance when the engine is in a motor road vehicle and the latter is stationary.

The present invention is more particularly applicable to high speed engines falling in the above-mentioned category which have the following features. One or more exhaust ports in the head of the cylinder and scavenging ports in the wall of the cylinder which are uncovered by the piston therein towards the end of the outstroke, passages through which the scavenging air flows leading to these ports from a scavenging air belt to which air is delivered by a displacer pump. Such a pump gives a "phased" supply of scavenge air to the cylinder as distinct from the supply of air delivered from a rotary blower. The invention may, however, be used with an engine in which a rotary blower delivers an "unphased" supply of scavenging and charging air to the cylinder. It is also applicable to engines having opposed pistons.

In a two-stroke cycle engine of the above-mentioned type owing to the large port area required for the scavenging air the closing of the inlet ports takes place late and the effective ratio of compression is low as compared with an engine operating on the four-stroke cycle. At low revolution speeds the pressure of the retained charging air in the cylinder when the inlet ports have just been closed is liable to be at or about that of the atmosphere and its temperature has not been raised appreciably by compression. On the other hand at relatively high revolution speeds the charging air pressure is substantial and moreover its temperature has been raised by compression in the scavenge pump or blower before the inlet ports are closed. Hence at low speeds there is in the cylinder relatively cold air whose pressure is not appreciably above that of the surrounding atmosphere at the moment of the closing of the inlet ports, but at high speeds there is heated air whose pressure is considerably above atmospheric pressure at the commencement of compression by the working piston. As a result there tends to be a large difference in both the final compression temperature and pressure as between high and low speeds. Since both temperature and pressure exert a powerful influence on the rapidity and completeness of combustion, it follows that the combustion conditions must vary widely as between high and low speeds. This wide difference becomes most apparent when the engine is "idling" at low speeds and no load when, in addition to low temperature and pressure, the internal parts, and more particularly any heat-insulated member when such is employed, are relatively cool. Under these conditions combustion tends to become sluggish and incomplete.

When an internal combustion engine operating on the two-stroke cycle and with compression ignition is "idling," and running under the condition indicated above, that is to say under no load and with the fuel charge reduced below that for normal running under load, according to this invention the pressure and temperature of the air retained in the cylinder when the inlet ports are closed are so varied that this pressure and temperature then tend to rise at least to the pressure and temperature existent at the same stage in the cycle when the engine is under load and running at higher speed. This variation of the pressure and temperature of the air retained in the cylinder is effected by obstructing in some degree, that is to a greater or less extent, the outflow of the exhaust gases from the cylinder. Conveniently the means by which and the manner in which the outflow of the exhaust gases is obstructed when the "idling" conditions indicated above are established, will bring about automatically the effect which it is desired to obtain by such gas-obstruction.

In an engine of the above-mentioned type having one or more valve-controlled exhaust ports in the head of the cylinder the outflow of the exhaust gases from the passage leading from such port or ports is obstructed to a greater or less extent when the engine is "idling" under no load and the fuel charge is reduced below that for normal running under load, the control of the obstruction of the outflow of the exhaust gases being effected by means and in a manner which, when the "idling" conditions indicated are established, will automatically bring about the gas-obstruction and produce the desired effect, namely to cause a rise in the pressure and temperature of the air in the cylinder when the inlet ports are closed. The automatic actuation of the means by which the gas-obstruction is effected may be controlled by or in accordance with the speed of the engine. It is desirable that this control should be associated directly or indirectly with means for varying the supply of fuel or the supplies of air and fuel to the engine. This obstruction of the outflow of exhaust gases is conveniently effected by the movement of a body suitably formed and disposed in the exhaust passage or in the mouth of this passage.

The form of this movable body and the means by which it is caused to bring about the extent of obstruction required at different times may vary. For example this body or member may have a streamline form and be mounted so as to be movable along and within the exhaust passage, or towards and into the outer orifice or mouth of this passage. The internal formation of this passage considered both in the transverse and longitudinal directions adjacent to the place where this body is disposed is determined so that the desired obstruction to gas flow through the passage will be effected as the body or member is moved in one direction and this obstruction will be lessened as the member is moved in the opposite direction. As indicated above, in place of being disposed actually within the exhaust gas passage, the movable member may be arranged adjacent to the external orifice or mouth of the exhaust manifold or outlet. If then the member is moved into this mouth it will bring about the desired variable obstruction as the gases are about to leave the exhaust passage. Again the obstruction may be effected by movement of a valve of suitable form disposed in the exhaust passage.

It is preferable that the obstructing body or member or valve should be spring-loaded or yieldingly mounted or actuated in such a way that in the event of any failure of the means by which the actuation of this member is effected, the risk of dangerous pressures developing in the engine will be obviated.

In the case of such an obstruction being constituted by a body of streamline or other form as is indicated above, the movement of this body in a direction away from the gas outlet, in order to reduce the exhaust gas pressure on the inner side of the outlet, may be effected by a mechanical linkage or by a hydraulic or pneumatic relay. A spring or springs, or in some cases the force of gravity is then relied on to effect the movement of the obstructing body in the opposite or obstructing direction. It may be desirable to arrange that a suitable delay is imposed on the unthrottling action of the obstructing member, that is its movement which tends to lessen the obstruction caused thereby.

Various means may be adopted to effect the control and actuation of the gas-obstructing member. Thus this control may be associated more or less directly with the speed of the engine. For instance movements derived from a centrifugal governor or from a device actuated by changes in the pressure of the circulation of cooling water may effect the desired control directly or indirectly, for example either through a linkage or by a hydraulic or pneumatic relay as indicated above.

If, however, the engine should happen to be provided with some known method of power control according to which variations in the pressure of the air in the inlet manifold of the engine produced by the manipulation of a manually operated air throttle are utilised to govern the fuel pump and thereby vary the quantity of fuel delivered to the engine, there may be combined with such a known arrangement suitable means for bringing about the desired control and movement of the obstructing member in the exhaust gas outlet. In a known method of governing or controlling the power of the engine, a manually operated throttle is disposed in the air intake manifold and the variations in pressure on the engine side of this throttle are utilised to effect variations in the amount of fuel delivered to the engine. When an engine thus controlled is "idling" and turning over at low speed and doing no external work, a certain depression will exist in the inlet manifold on the engine side of the air throttle. If now the engine is rotated at a higher speed by some external means such as an electric motor or if, through being still connected to the transmission it is overrun, then in order to maintain the same depression in the manifold as existed when "idling" it is necessary to open slightly the air controlling throttle, and within certain limits, the higher the speed at which the engine is "motored," the more the throttle has to be moved towards the open position in order to maintain the same depression in the manifold.

From this it will be apparent that the position of the throttle controlling the air supply is related to the speed at which the engine is being "motored," and consequently it becomes possible to make use of the various positions of the air controlling throttle to control also say a hydraulic relay as above described by means of which movement is imparted to the obstructing body or member which will effect the variation in the pressure of the exhaust gases in the exhaust manifold and of the retained charging air in the cylinder.

The present invention is to be differentiated from a known arrangement in which for the purpose of carrying an overload the exhaust from an engine operating on the two-stroke cycle is obstructed or "strangled" while simultaneously the quantity of the charge supplied to the cylinder is increased. This "strangling" was arranged to produce a supercharged condition in the cylinder when carrying an overload. On the other hand the obstruction of the outflow of exhaust gases in the manner and by the means comprised in the present invention is, as stated above, for the purpose of ensuring satisfactory running of the engine under "idling" conditions. It may be remarked, however, that the present improvement may be used for the purpose of carrying an overload in conjunction with the "strangling" procedure described above. Such a combination of the known "strangling" and the present improvement may be carried out for example somewhat in the following manner where the engine is employed for the propulsion of a motor road vehicle. The accelerator pedal of the vehicle for normal loads is arranged so that it will come up against a resilient stop which will be moved by the application of further foot pressure to the pedal. This will bring into action the obstructing device provided for the "idling" conditions whether this device comprises a body disposed in or at the mouth of the exhaust passage or if it is a throttle disposed in that passage or alternatively a separate and additional obstructing device may then be provided.

The accompanying drawings illustrate by way of example one way in which the invention may be carried into practice. In these drawings—

Figure 1:
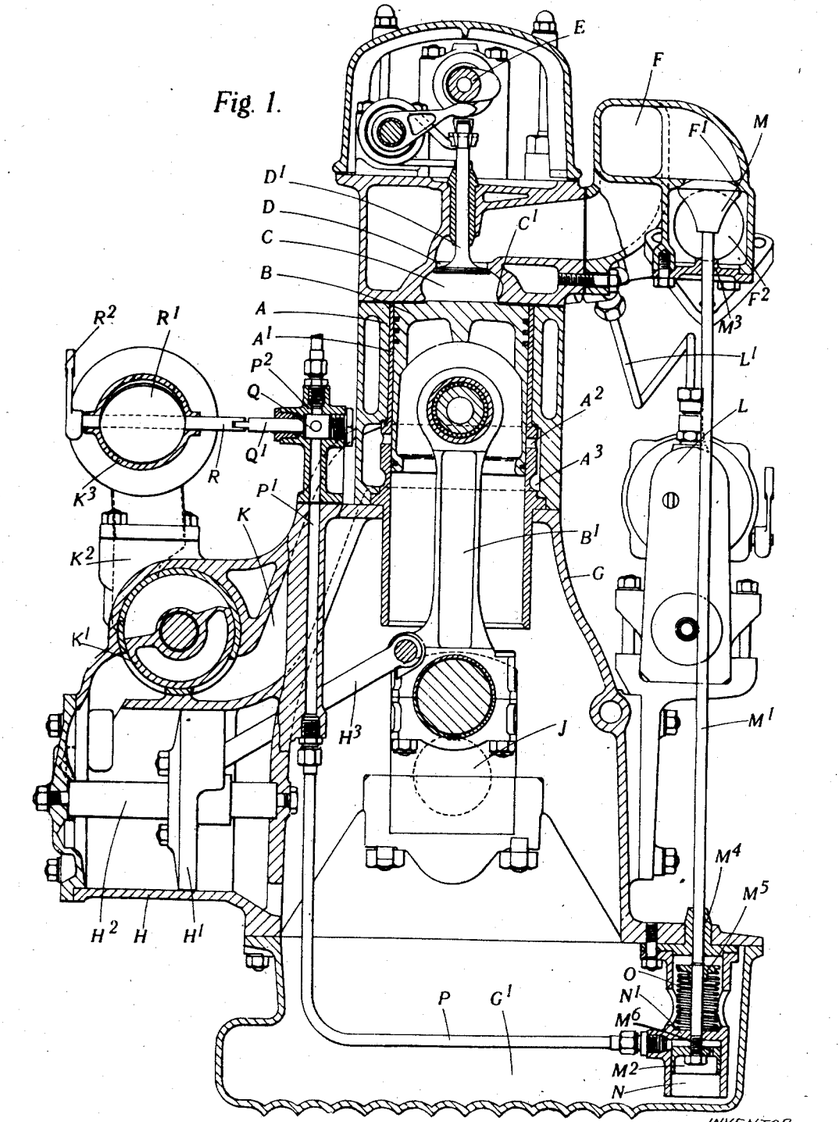
Figure 1 is a sectional elevation in a plane transverse and normal to the crankshaft axis showing one construction of internal combustion engine operating on the two-stroke cycle with compression ignition provided with the present invention.

The internal combustion engine operating with compression ignition shown in Figure 1 as having the present invention applied thereto comprises the following principal features.

In the cylinder A is a liner $A^1$ in the wall of which are ports $A^2$ through which scavenge air enters from a scavenge air belt $A^3$. The ports $A^2$ are positioned where they will be uncovered by the piston B towards the end of its outstroke. In the head of the cylinder is a combustion chamber C of the "open" type, that is to say the communicating opening between this chamber and the cylinder A is a "mouth" of substantial size. The chamber C is centrally situated with respect to the cylinder A having a contour which is a figure of revolution about the cylinder axis. The diameter of the annular lip $C^1$ round the mouth of the chamber C is somewhat less than the maximum diameter of the chamber. Into this chamber there is forced by the piston at the end of its compression stroke as much of the air charge as is practicable from the constructional point of view.

Centrally situated in the inner wall of the combustion chamber C and hence opposite to the mouth of this chamber, is an exhaust port D in which is situated a poppet valve $D^1$. This valve is actuated by an overhead camshaft E. The exhaust port D opens into a passage which leads into the exhaust manifold F, the outlet from this manifold being by way of an opening $F^1$ leading to a passage $F^2$ in communication with the atmosphere.

The cylinder A is mounted on a casing G enclosing the crankshaft and having below it an oil sump $G^1$. On one side of the casing G is a pump cylinder H which projects laterally with its axis at right angles to the plane in which lies the axis of the cylinder and the axis of the crankshaft J. The horizontal plane in which lies the axis of the pump cylinder is situated somewhat below the axis of the crankshaft J. In the cylinder H is a piston $H^1$ which is reciprocated on a rod $H^2$ whose ends are fixed at the ends of the cylinder H, movement being imparted to the piston $H^1$ by a link $H^3$ which connects it to the big-end of the connecting rod $B^1$.

Extending from the cylinder H to the scavenge air belt $A^3$ is a transfer passage K in which is a rotary valve $K^1$. This valve controls on the one hand the intake of air to the cylinder H from an air inlet pipe $K^2$ and on the other hand the delivery of air by the pump through the passage K to the scavenge air belt $A^3$. Owing to the phasing relation between the movements of the working piston B and the piston $H^1$ of the pump and by reason of the timing effected by the rotary valve $K^1$, air under a pressure above the mean scavenging pressure is trapped in the scavenge air belt $A^3$ and the transfer passage K between the valve $K^1$ and that belt.

The fuel injector which is not shown in the drawings but is connected to the fuel pump L by a pipe $L^1$ delivers fuel into the combustion chamber C through the side wall of that chamber.

In the above-described engine the outflow of exhaust gases through the port D and passage F is obstructed under the "idling" conditions indicated by a member M which can be moved towards and into or away from the opening $F^1$ through which the exhaust gases pass from the manifold F. The obstructing member M is mounted at the upper end of a rod $M^1$ on the lower end of which is a piston $M^2$ which can reciprocate in a cylinder N situated in the oil sump $G^1$. The rod $M^1$ is guided and can slide vertically in bearings $M^3$, $M^4$ and it is acted on above the cylinder N by a coiled spring O situated between a collar $M^5$ on the rod $M^1$ and the upper and closed end $N^1$ of the cylinder N whose lower end is open. This spring O tends to raise the rod $M^1$ and move the obstructing member M towards the opening $F^1$. Movement in the opposite direction is caused by oil pressure in the cylinder N above the piston $M^2$ this pressure being conveyed through a pipe P and passage $P^1$ from the lubricating oil system of the engine. In a body $P^2$ in the upper part of the oil passage $P^1$ is a rotatable cock Q whose spindle $Q^1$ is connected to the spindle R of a butterfly valve $R^1$ disposed in some convenient position in the air intake passage $K^3$. A lever $R^2$ on the spindle R enables the valve $R^1$ and the cock Q to be moved simultaneously.

A leak-off opening $M^6$ through the piston $M^2$ enables oil under pressure in the cylinder N above the piston $M^2$ to gradually flow away into the sump $G^1$. When oil pressure is transmitted through the pipe P to the cylinder N above the piston $M^2$ the obstructing member M will be moved into and maintained in a position clear of the opening $F^1$ so as to allow the exhaust gases to flow freely through this opening to the atmosphere. If, however, the oil pressure in the pipe P is cut off the spring O will cause the piston $M^2$ to move upwards carrying with it the obstructing member M which will thus be moved towards or into the exhaust gas opening $F^1$. This upward movement of the piston $M^2$ becomes possible since the oil in the cylinder N above the piston can escape through the leak-off hole $M^6$ in the piston after closing of the cock Q. This obstruction by the member M will thus occur when the engine is running under the "idling" conditions indicated. The obstruction of the outflow of exhaust gases will result in a back pressure in the cylinder A which will cause a rise in the pressure and temperature of the air retained in the cylinder after the scavenge air ports $A^2$ have been closed by the piston B on its compression stroke.

The oil pressure in the pipe P and in the cylinder N above the piston $M^2$ is controlled by rotation of the cock Q when the air throttle valve $R^1$ is turned. If the lever $R^2$ is moved in a direction tending to close the throttle valve $R^1$, not only will the cock Q be turned towards its closed position, shown at I in Figure 3, but the depression caused in the air inlet passages $K^2$, $K^3$ acts in a known manner on the fuel delivery pump L in such a way as to reduce the supply of fuel delivered into the combustion chamber C, for example as disclosed in the British patent to Junkers, No. 286,707.

Continued rotation of the spindle R will further increase the depression in the air inlet passages and cause a corresponding decrease in the fuel supply until a rotational adjustment of the spindle R and valve $R^1$ is reached in which only sufficient fuel will be fed to the engine to maintain it at the desired "idling" speed on no load. The relative angular settings of the throttle valve $R^1$ and the cock Q are such that when the throttle $R^1$ is set to cause the depression which will give the fuel supply required for the no load "idling" condition the cock Q will be closed. Thus the oil pressure above the piston $M^2$ will be cut off when the throttle valve $R^1$ is closed to the extent that it will normally be closed when the engine is to continue running under "idling" conditions with no load.

Figure 2:
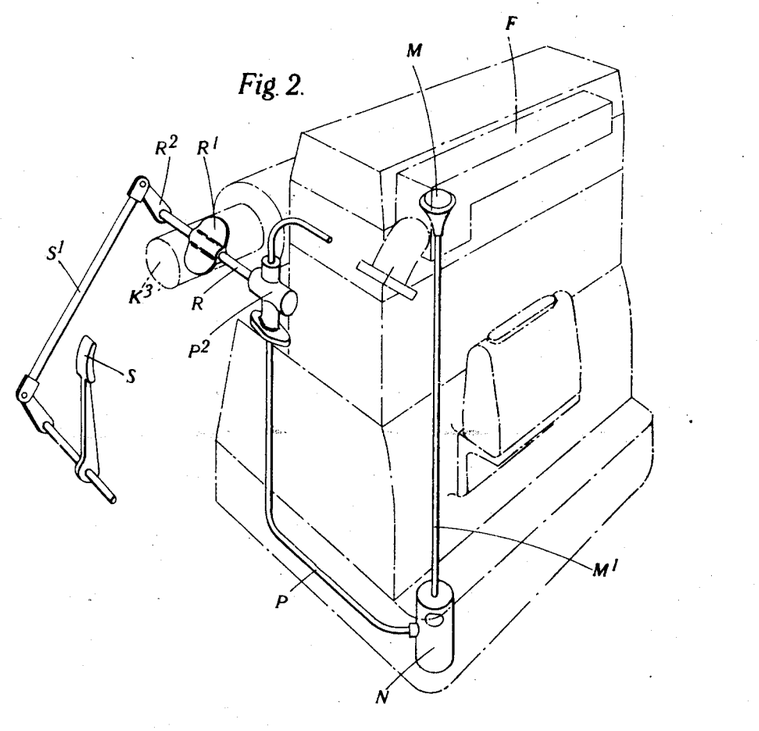
Figure 2 is a diagrammatic perspective view of an engine showing the arrangement of the apparatus described more particularly with reference to Figure 1.

In Figure 2 there is shown how the throttle valve $R^1$ and the cock Q in the casing $P^2$ for exercising the discriminating control may be actuated by a foot pedal S through a link $S^1$ connected to the lever $R^2$.

Figure 3:
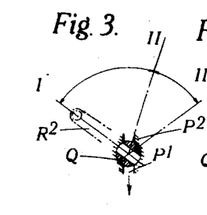
Figures 3, 4 and 5 are sectional diagrammatic views showing positions of a control cock described hereunder.
Figures 4, 5:
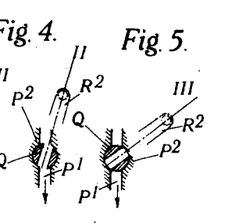

By suitable operation of the cock Q the obstruction or "strangling" of the outflow of the exhaust gases may be caused to occur at such times as to produce a supercharged condition in the cylinder when the engine is carrying an overload. Such a use of "strangling" has previously been proposed as mentioned above. Figures 3, 4 and 5 show different positions of the cock Q corresponding to different engine conditions and the effects then to be produced. The oil flow under pressure through the passage $P^1$ to the cylinder N is in the direction indicated by the arrow in each of these figures.

In Figure 3 are shown three principal positions which may be occupied by the lever $R^2$ by means of which the cock is moved. The position I is that when the engine is idling and the cock Q is moved to close the passage $P^1$ with the result that there is no pressure above the piston $M^2$ and consequently the spring O will move the obstructing member M towards or into the exhaust gas outflow opening $F^1$.

During normal running of the engine the throttle lever $R^2$ will be moved between the positions I and II. In the latter position the cock Q will be as shown in Figure 4 this position corresponding to full load conditions. The pressure of the lubricating oil system can now act through the pipe P on the piston $M^2$ and cause the obstructing member M to move clear of the opening $F^1$ leaving a free outflow for the exhaust gases.

If owing to an overload it is desired to produce a supercharged condition by "strangling" combined with full throttle and fuel supply, the lever $R^2$ is moved beyond the position II into the position III wherein, as shown in Figure 5, the cock Q has again closed or almost closed the passage $P^1$ with the same effect on the movement of the obstructing member M as when the lever $R^2$ and cock Q were in the "idling" position I as shown in Figure 3.

To enable the overload "strangling" effect for supercharging to be obtained, the spindle $Q^1$ of the cock Q and the spindle R of the air throttle valve $R^1$ may not be directly connected as shown in Figure 1. By means of a yielding connection between the throttle lever S and the valve spindle R and by providing a stop beyond which at full throttle the valve $R^1$ cannot be moved, while there is a positive connection between the lever $R^2$ and the cock spindle $Q^1$, movement of the cock can be continued into the position III shown in Figure 5 while the throttle valve $R^1$ will remain fully open.

Figure 6:
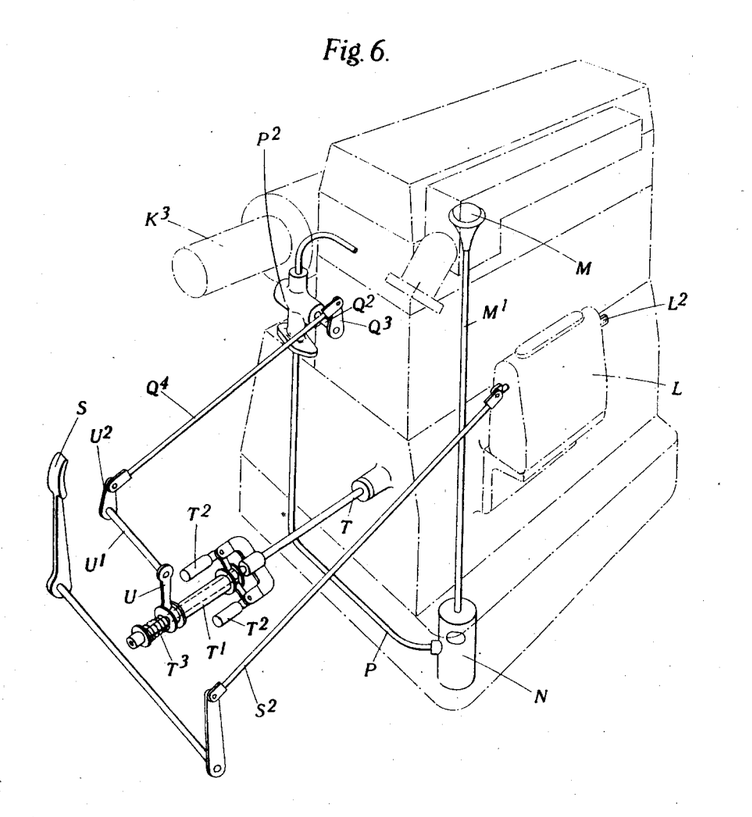
Figure 6 is a diagrammatic perspective view similar to Figure 1 but illustrating an alternative method of controlling the movements of the exhaust-gas-obstructing member.

Referring to Figure 6 there is here shown an arrangement by means of which the liquid pressure acting on and imparting movement to the gas-obstructing member M is controlled automatically in accordance with the speed of the engine. In this arrangement the engine is controlled from the foot pedal S by movement through a link $S^2$ of the rack member $L^2$ which in the fuel pump L controls and varies the fuel supply to the engine. In an engine thus controlled there is no throttle valve in the air intake $K^3$ as in the arrangement previously described. The movement of the cock in the casing $P^2$ which controls the flow of oil under pressure through the pipe P to the cylinder N where it acts through the rod $M^1$ on the gas-obstructing member M, is effected automatically in the following way. Arranged on or driven from the engine crankshaft is a governor of some suitable type. This governor here shown diagrammatically comprises a shaft T through which it is driven from the engine crankshaft this shaft having thereon a sleeve $T^1$ adapted to be moved along the shaft T by the weights $T^2$ when these swing radially in accordance with the speed of the engine. The sleeve $T^1$ moves against the action of a spring $T^3$ and imparts movement to a lever U on a rock shaft $U^1$. On the spindle $Q^2$ of the cock in the casing $P^2$ is a lever $Q^3$ connected by a link $Q^4$ to a lever $U^2$ on the rock shaft $U^1$.

When the engine is running normally at speed the governor weights $T^2$ fly out and through the sleeve $T^1$ cause the lever $Q^3$ of the control cock to be turned clockwise as seen in Figure 6. This moves the cock Q into substantially the position II in which it is shown in Figure 4. If now the speed of the engine falls to the speed at which it would ordinarily run when "idling" and disconnected from the transmission, the governor weights $T^2$ will swing in towards the shaft T and such movement will be imparted through the rock shaft $U^1$ to the cock spindle $Q^2$ that the cock will move substantially into the position I in which it is shown in Figure 3. The hydraulic pressure operative in the cylinder N on the gas-obstructing member M will then be cut off so that the spring acting against this hydraulic pressure on the gas-obstructing member will cause the latter to obstruct to a greater or less extent the outflow of exhaust gases from the exhaust gas manifold F.

If now by movement of the pedal S and the fuel-controlling rack $L^2$ the fuel supply to the engine is increased and the speed of the latter increases, the swinging out of the governor weights $T^2$ will again turn the spindle $Q^2$ of the cock so as once more to cause the hydraulic pressure to act in the cylinder N and withdraw the obstructing member M from the orifice through which the exhaust gases flow from the exhaust gas manifold F.

It will be noted that in this arrangement while the movements of the gas-obstructing member M take place automatically and in accordance with the speed of the engine so that obstruction to the outflow of exhaust gases will be effected and the desired end attained when the engine is running slow and "idling," this effect will not be obtained when the engine is under the "idling" conditions existent when the engine is being overrun or motored since the speed of the engine under those conditions will be such as to cause the goverrior to maintain the cock Q in the position II shown in Figure 4 in which the oil pressure can act in the cylinder N and keep the member M from obstructing the outflow of exhaust gases.

What I claim as my invention and desire to secure by Letters Patent is:

1. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, said member being constructed and arranged for movement out of such obstructing positions in response to application thereto of excessive exhaust gas pressures, yielding means tending automatically to move the said member in a direction which will cause it to obstruct the exhaust gas outflow, and positively acting means automatically operable in response to variation in operating conditions for moving the said member in a direction which will reduce obstruction thereby to the gas outflow as set forth.

2. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, said member being constructed and arranged for movement out of such obstructing positions in response to application thereto of excessive exhaust gas pressures, yielding means tending automatically to move the said member in a direction which will cause it to obstruct the exhaust gas outflow, and hydraulically actuated means for moving the said member in a direction which will reduce obstruction thereby to the gas outflow as set forth.

3. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, said member being constructed and arranged for movement out of such obstructing positions in response to application thereto of excessive exhaust gas pressures, spring-actuated means to move the said member in a direction which will cause it to obstruct the exhaust gas outflow, and hydraulically actuated means for moving the said member against the action of the spring in a direction which will reduce obstruction thereby to the gas outflow as set forth.

4. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, means tending automatically to move the said member in a direction which will cause it to obstruct the exhaust gas outflow, and a member acted on and movable by hydraulic pressure derived from the engine lubricating system this member being connected to and movable by this hydraulic pressure with the said gas-obstructing member in a direction which will reduce obstruction thereby to the gas outflow as set forth.

5. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, means tending automatically to move the said member in a direction which will cause it to obstruct the exhaust gas outflow, a member acted on and movable by hydraulic pressure derived from the engine lubricating system this member being connected to and movable by this hydraulic pressure with the said gas-obstructing member in a direction which will reduce obstruction thereby to the gas outflow, and a cock in the hydraulic pressure system with means for moving this cock to control this pressure and the movement it imparts to the gas-obstructing member as set forth.

6. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions where in it will obstruct in some degree the outflow of exhaust gases through the said opening, spring-actuated means to move the said member in a direction which will cause it to obstruct the exhaust gas outflow, a member acted on and movable by hydraulic pressure derived from the engine lubricating system this member being connected to and movable by this hydraulic pressure with the said gas-obstructing member in a direction opposite to that in which the gas-obstructing member is moved by the said spring, and a cock in the hydraulic pressure system with means for moving this cock to control this pressure and the movement it imparts to the gas-obstructing member as set forth.

7. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, a cylinder with a piston movable therein and connected to the said gas-obstructing member, means tending automatically to move the piston and the said member in a direction which will cause the member to obstruct the exhaust gas outflow, and a pipe connection between the engine lubricating system and the said cylinder through which piping oil under pressure can act in the cylinder on the piston and move it and the said gas-obstructing member in a direction which will reduce obstruction thereby to the gas outflow as set forth.

8. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, a cylinder with a piston movable therein and connected to the said gas-obstructing member, a spring acting on the said member to move the piston and the member in a direction which will cause the member to obstruct the exhaust gas outflow, and a pipe connection between the engine lubricating system and the said cylinder through which piping oil under pressure can act in the cylinder on the piston and move it and the said gas-obstructing member in a direction opposite to that in which it is moved by the said spring thereby reducing the obstruction to the gas outflow as set forth.

9. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, a cylinder with a piston movable therein and connected to the said gas-obstructing member, a spring acting on the said member to move the piston and the member in a direction which will cause the member to obstruct the exhaust gas outflow, a pipe connection between the engine lubricating system and the said cylinder through which piping oil under pressure can act in the cylinder on the piston and move it and the said gas-obstructing member in a direction opposite to that in which it is moved by the said spring thereby reducing the obstruction to the gas ouflow, and means controlling the oil pressure in the said cylinder and the movement it imparts to the gas-obstructing member as set forth.

10. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, a cylinder with a piston movable therein and connected to the said gas-obstructing member, a spring acting on the said member to move the piston and the member in a direction which will cause the member to obstruct the exhaust gas outflow, a pipe connection between the engine lubricating system and the said cylinder through which piping oil under pressure can act in the cylinder on the piston and move it and the said gas-obstructing member in a direction opposite to that in which it is moved by the said spring thereby reducing the obstruction to the gas outflow, and a cock in the oil passage leading to the said cylinder with means for moving this cock to control the oil pressure acting in the cylinder and the movement it imparts to the gas-obstructing member as set forth.

11. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, spring-actuated means to move the said member in a direction which will cause it to obstruct the exhaust gas outflow, means for moving the said member against the action of the spring in a direction which will reduce obstruction thereby to the gas outflow, means controlling the said means which move the said member against the action of the spring, and means for controlling the supply of air and fuel respectively to the working cylinder this control being associated with the said means which control the movement of the gas-obstructing member as set forth.

12. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, a cylinder with a piston movable therein and connected to the said gas-obstructing member, a spring acting on the said member to move the piston and the member in a direction which will cause the member to obstruct the exhaust gas outflow, a pipe connection between the engine lubricating system and the said cylinder through which piping oil under pressure can act in the cylinder on the piston and move it and the said gas-obstructing member in a direction opposite to that in which it is moved by the said spring thereby reducing the obstruction to the gas outflow, means controlling the oil pressure in the said cylinder and the movement it imparts to the gas-obstructing member, and means for controlling the supply of air and fuel respectively to the working cylinder this control being associated with the said means which control the oil pressure in the said cylinder as set forth.

13. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, a cylinder with a piston movable therein and connected to the said gas-obstructing member, a spring acting on the said member to move the piston and the member in a direction which will cause the member to obstruct the exhaust gas outflow, a pipe connection between the engine lubricating system and the said cylinder through which piping oil under pressure can act in the cylinder on the piston and move it and the said gas-obstructing member in a direction opposite to that in which it is moved by the said spring thereby reducing the obstruction to the gas outflow, a cock in the oil passage leading to the said cylinder with means for moving this cock to control the oil pressure acting in the cylinder and the movement it imparts to the gas-obstructing member, and means for controlling the supply of air and fuel respectively to the working cylinder such means being associated with the means for moving the said cock controlling the oil pressure as set forth.

14. In an internal combustion engine operating on the two-stroke cycle with compression ignition, the combination of a cylinder, at least one valve-controlled exhaust port in the head of this cylinder, an exhaust manifold into which the gases from this port pass and whence they can escape through an outlet opening to the atmosphere, a member mounted adjacent to the said exhaust gas outlet opening and movable into positions wherein it will obstruct in some degree the outflow of exhaust gases through the said opening, spring-actuated means to move the said member in a direction which will cause it to obstruct the exhaust gas outflow, a member acted on and movable by hydraulic pressure derived from the engine lubricating system this member being connected to and movable by this hydraulic pressure with the said gas-obstructing member in a direction opposite to that in which the said gas-obstructing member is moved by the said spring, and a cock in the hydraulic pressure system with means for moving this cock to control this pressure and the movement it imparts to the gas-obstructing member as set forth.

15. In an internal combustion engine operating on the two-stroke cycle with compression ignition, the combination of a cylinder, at least one valve-controlled exhaust port in the head of this cylinder, an exhaust manifold into which the gases from this port pass and whence they can escape through an outlet opening to the atmosphere, a member mounted adjacent to the said exhaust gas outlet opening and movable into positions wherein it will obstruct in some degree the outflow of exhaust gases through the said opening, a cylinder with a piston movable therein and connected to the said gas-obstructing member, a spring acting on the said member to move the piston and the member in a direction which will cause the member to obstruct the exhaust gas outflow, and a pipe connection between the engine lubricating system and the said cylinder through which piping oil under pressure can act in the cylinder on the piston and move it and the said gas-obstructing member in a direction opposite to that in which it is moved by the said spring thereby reducing the obstruction to the gas outflow as set forth.

16. In an internal combustion engine operating on the two-stroke cycle with compression ignition, the combination of a cylinder, at least one valve-controlled exhaust port in the head of this cylinder, an exhaust manifold into which the gases from this port pass and whence they can escape through an outlet opening to the atmosphere, a member mounted adjacent to the said exhaust gas outlet opening and movable into positions wherein it will obstruct in some degree the outflow of exhaust gases through the said opening a cylinder with a piston movable therein and connected to the said gas-obstructing member, a spring acting on the said member to move the piston and the member in a direction which will cause the member to obstruct the exhaust gas outflow, a pipe connection between the engine lubricating system and the said cylinder through which piping oil under pressure can act in the cylinder on the piston and move it and the said gas-obstructing member in a direction opposite to that in which it is moved by the said spring thereby reducing the obstruction to the gas outflow, and means controlling the oil pressure in the said cylinder and the movement it imparts to the gas-obstructing member as set forth.

17. In an internal combustion engine operating on the two-stroke cycle with compression ignition, the combination of a cylinder, at least one valve-controlled exhaust port in the head of this cylinder, an exhaust manifold into which the gases from this port pass and whence they can escape through an outlet opening to the atmosphere, a member mounted adjacent to the said exhaust gas outlet opening and movable into positions wherein it will obstruct in some degree the outflow of exhaust gases through the said opening, spring-actuated means to move the said member in a direction which will cause it to obstruct the exhaust gas outflow, means for moving the said member against the action of the spring in a direction which will reduce obstruction thereby to the gas outflow, means controlling the said means which move the said member against the action of the spring, and means for controlling the supply of air and fuel respectively to the working cylinder this control being associated with the said means which control the movement of the gas-obstructing member as set forth.

18. In an internal combustion engine operating on the two-stroke cycle with compression ignition, the combination of a cylinder, at least one valve-controlled exhaust port in the head of this cylinder, an exhaust manifold into which the gases from this port pass and whence they can escape through an outlet opening to the atmosphere, a member mounted adjacent to the said exhaust gas outlet opening and movable into positions wherein it will obstruct in some degree the outflow of exhaust gases through the said opening, a cylinder with a piston movable therein and connected to the said gas-obstructing member, a spring acting on the said member to move the piston and the member in a direction which will cause the member to obstruct the exhaust gas outflow, a pipe connection between the engine lubricating system and the said cylinder through which piping oil under pressure can act in the cylinder on the piston and move it and the said gas-obstructing member in a direction opposite to that in which it is moved by the said spring thereby reducing the obstruction to the gas outflow, a cock in the oil passage leading to the said cylinder with means for moving this cock to control the oil pressure acting in the cylinder and the movement it imparts to the gas-obstructing member, and means for controlling the supply of air and fuel respectively to the working cylinder such means being associated with the means for moving the said cock controlling the oil pressure as set forth.

19. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member mounted adjacent to the said exhaust gas outlet opening and movable into positions wherein it will obstruct in some degree the outflow of exhaust gases through the said opening, said member being constructed and arranged for movement out of such obstructing positions in response to application thereto of excessive exhaust gas pressures, spring-actuated means to move the said member in a direction which will cause it to obstruct the exhaust gas outflow, and positively acting means actuated and controlled automatically in accordance with the speed of the engine for moving the said member against the action of the spring in a direction which will reduce obstruction thereby to the gas outflow as set forth.

20. In an internal combustion engine operating on the two-stroke cycle with compression ignition, the combination of at least one valve-controlled exhaust port through which the exhaust gases pass from the cylinder into an exhaust manifold and thence through an opening to the atmosphere, a member yieldingly mounted opposite to the said exhaust gas outlet opening towards and away from which it is movable to position it where it will obstruct in some degree the outflow of exhaust gases through the said opening, the yielding mounting for this member tending automatically to move it towards the said opening and cause it to obstruct the gas outflow but then permitting undue pressure of exhaust gases in the manifold to move the obstructing member and allow these gases to escape, and positively acting means automatically operable in response to variation in operating conditions for moving the said member away from the said opening, thereby reducing the obstruction to the gas outflow as set forth.

HARRY RALPH RICARDO.